United States Patent [19]

Andres et al.

[11] 4,025,470

[45] May 24, 1977

[54] PROCESS FOR THE PRODUCTION OF FLAME-RESISTANT, HARD POLYURETHANE FOAMS

[75] Inventors: Karlheinz Andres, Cologne; Kuno Wagner, Leverkusen; Erwin Hoffmann, Leverkusen; Manfred Kapps, Leverkusen, all of Germany

[73] Assignee: Bayer Aktiengesellschaft, Leverkusen, Germany

[22] Filed: Apr. 24, 1975

[21] Appl. No.: 571,331

[30] Foreign Application Priority Data

May 7, 1974 Germany ............................ 2421986

[52] U.S. Cl. ..................... 260/2.5 AJ; 260/2.5 AM; 260/2.5 AQ; 260/2.5 BB; 260/77.5 AR
[51] Int. Cl.$^2$ ................. C08G 18/06; C08G 18/14; C08G 18/28
[58] Field of Search ............. 260/2.5 AJ, 77.5 AR, 260/2.5 AM, 2.5 BB, 2.5 AQ

[56] References Cited

UNITED STATES PATENTS

| | | | |
|---|---|---|---|
| 2,865,912 | 12/1958 | Pohlemann et al. | 260/326 E |
| 2,965,584 | 12/1960 | Elkin | 260/2.5 AC |
| 3,758,444 | 9/1973 | Wagner et al. | 260/33.6 UB |
| 3,770,703 | 11/1973 | Gruber | 260/77.5 TB |
| R27,887 | 1/1974 | McGary et al. | 260/2.5 AJ |

FOREIGN PATENTS OR APPLICATIONS

| | | |
|---|---|---|
| 2,129,198 | 12/1972 | Germany |
| 1,056,360 | 1/1967 | United Kingdom |

OTHER PUBLICATIONS

Kimura et al.–Chem. Abs. 74, 55013g (1971).
Schoen et al.–Chem. Abs. 78, 161024m (1973).
Kreuder et al.–Chem. Abs. 82, 45176w (1975).

*Primary Examiner*—Melvyn I. Marquis
*Assistant Examiner*—H. H. Fletcher
*Attorney, Agent, or Firm*—Gene Harsh; Joseph C. Gil; William E. Parry

[57] ABSTRACT

The instant invention relates to a process for the production of flame-resistant, hard foams which contain urethane groups from polyisocyanates, active-hydrogen containing compounds, water and/or organic blowing agents, and flame-retarding agents, the improvement wherein the flame-retarding agent used is a mixture of (a) an addition compound of (1) a monoalcohol, a polyalcohol, or mixtures thereof, and (2) a lactam, and (b) a phosphorous containing acid or acid ester.

8 Claims, No Drawings

PROCESS FOR THE PRODUCTION OF FLAME-RESISTANT, HARD POLYURETHANE FOAMS

BACKGROUND OF THE INVENTION

It is already known that hard foam plastics which contain urethane groups can be produced by reacting compounds having a molecular weight of 400 to 10,000, and containing at least two hydrogen atoms which are reactive with isocyanates, with polyisocyanates in the presence of water and/or organic blowing agent and in the presence of flame-retarding agents which contain phosphorous, with the addition of activators, foam-stablilizers and optionally other foaming agents.

The use of phosphoric acid esters or phosphoric acids as flame-retarding agents for the production of foams which contain urethane groups is described in British patent specification Nos. 919,067 and 1,056,360. It has been found, however, that the use of these flame-retarding agents has numerous disadvantages.

Acids of phosphorus could not previously be used in foamable systems without serious disadvantages. There was either a risk of complete or partial collapse of the foam and excessive slowing down of the reaction or very pronounced faults, such as pits or cracks, appeared in the finished foam. In many formulations, it was also necessary to accept the incompatibility of the hydrophilic system in the hydrophobic system.

German Offlengungsschrift 2,129,198 describes a process for the production of foam plastics which uses addition compounds consisting of 0.1 to 15 mols of water and one mol of a lactam of the general formula:

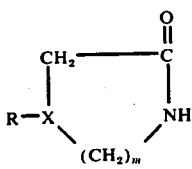

wherein X represents a CH-group, in which case R represents hydrogen and $m$ an integer of from 0 to 9 or X represents a nitrogen atom, in which case R represents a $C_1$–$C_{18}$-alkyl or $C_7$–$C_{15}$-aralkyl group or a pyridine group optionally substituted by lower alkyl groups ($C_1$–$C_6$) and $m$ represents 3, in which addition compounds the water may be partly replaced by polyalcohols, polyamines or hydrazines.

The resulting foams do not have satisfactory flame-resistant characteristics.

DESCRIPTION OF THE INVENTION

It is an object of this invention to obviate the disadvantages of known hard polyurethane foams described above and to substantially improve flame-resistance for a comparable phosphorous content. This problem is solved with the hard polyurethane foams produced according to the invention.

The instant invention relates to a process for the production of flame-resistant, hard foams which contain urethane groups from polyisocyanates, active-hydrogen containing compounds, water and/or organic blowing agents, and flame-retarding agents, the improvement wherein the flame-retarding agent used is a mixture of (a) an addition compound of (1) a monoalcohol, a polyalcohol, or mixtures thereof, and (2) a lactam, and (b) a phosphorous containing acid or acid ester.

Preferably, the foams herein are derived from polyisocyanates, compounds having a molecular weight of 100 to 10,000 which contain at least two hydrogen atoms which are reactive with isocyanates, water and/or organic blowing agents, flame-retarding agents and optionally activators, foam stabilizers and other additives, characterized in that the flame-retarding agents used are mixtures preferably comprising (a) from about 1 to about 99 percent by weight of an addition compound obtained by preferably reacting 0.1 to 15 mols of a monohydric and/or polyhydric alcohol with one mol of a lactam, said lactam preferably being of the general formula:

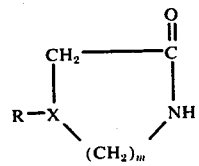

wherein X represents a CH-group and R represents hydrogen and $m$ an integer of from 0 to 9 or X represents a nitrogen atom and R represents a $C_1$–$C_{18}$-alkyl group or $C_7$–$C_{15}$- aralkyl group or a pyridine group optionally substituted by $C_1$–$C_6$-alkyl groups and $m$ represents 3, in which the monohydric and/or polyhydric alcohol may be partly or completely replaced by water, and, (b) from about 99 to about 1 percent by weight of a phosphorous-containing acid and/or a neutral phosphoric and/or phosphonic and/or phosphorous acid ester.

The polyisocyanates used as starting components according to the invention may be essentially any organic polyisocyanate, including aliphatic, cycloaliphatic, aryliphatic, aromatic or heterocyclic polyisocyanates of the kind described e.g. by W. Siefgen in Justus Liebigs Annalen der Chemie, 562, pages 75 to 136. Examples include ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (DAS 1,202,785), hexahydrotolylene-2,4- and 2,6-diisocyanate and any mixture of these isomers, hexahydrophenylene-1,3- and/or 1,4-diisocyanate, perhydrodiphenylmethane-2,4'- and/or -4,4'-diisocyanate, phenylene-1,3- and 1,4-diisocyanate, tolylene-2,4- and -2,6-diisocyanate and any mixtures of these isomers, diphenylmethane-2,4' and/or 4,4'-diisocyanate, naphthylene-1,5-diisocyanate, triphenylmethane-4,4',4''-triisocyanate, polyphenylpolymethylene polyisocyanates of the kind which can be obtained by aniline-formaldehyde condensation followed by phosgenation and which have been described e.g. in British patent specification Nos. 874,430 and 848,671 perchlorinated aryl polyisocyanates as described e.g. in German Auslegeschrift No. 1,157,601, polyisocyanates which contain carbodiimide groups as described in German patent specification No. 1,092,007, diisocyanates of the kind described in U.S. patent specification No. 3,492,330, polyisocyanates which contain allophanate groups as described e.g. in British patent specification No.

994,890, Belgian Patent Specification 761,626 and published Dutch patent application No. 7,102,524, polyisocyanates which contain isocyanurate groups as described e.g. in German patent specification Nos. 1,022,789; 1,222,067 and 1,027,394 and in German Offenlegungsschriften Nos. 1,929,054 and 2,004,048 polyisocyanates which contain urethane groups as described e.g. in Belgian patent specification Nos. 752,261 or in U.S. Pat. No. 3,394,164, polyisocyanates which contain acylated urea groups according to German patent specification No. 1,230,778 polyisocyanates which contain biuret groups as described e.g. in German patent specification No. 1,101,394, in British patent specification No. 889,050 and in French patent specification No. 7,017,514 polyisocyanates prepared by telomerization reactions as described e.g. in Belgian patent specification No. 723,640 polyisocyanates which contain ester groups such as those mentioned e.g. in British patent specification Nos. 956,474 and 1,072,956 in U.S. patent specification Nos. 3,567,763 and in German patent specification No. 1,231,688 and reaction products of the above-mentioned isocyanates with acetals in accordance with German patent specification No. 1,072,385.

Distillation residues from the commercial production of isocyanates which still contain isocyanate groups may also be used, optionally dissolved in one or more of the above-mentioned polyisocyanates. Any mixtures of the above-mentioned polyisocyanates may also be used.

It is generally particularly preferred to use readily available polyisocyanates such as tolylene-2,4- and -2,6-diisocyanate and any mixtures of these isomers ("TDI"), polyphenyl-polymethylene-polyisocyanates which can be obtained by aniline-formaldehyde condensation followed by phosgenation ("crude MDI") and polyisocyanates which contain carbodiimide, urethane, allophanate, isocyanurate, urea or biuret groups ("modified polyisocyanates").

The starting components used according to the invention also include compounds having a molecular weight generally of 100–10,000 which contain at least two hydrogen atoms capable of reacting with isocyanates. These compounds, including compounds which contain amino groups, thiol groups or carboxyl groups, are in the preferred embodiment polyhydroxyl compounds. Particularly desirable compounds are those containing 2 to 8 hydroxyl groups, and molecular weights of 800 to 10,000 (most preferably 1000 to 6000), e.g. polyesters, polyethers, polythioethers, polyacetals, polycarbonates or polyester amides which contain at least 2, generally 2 to 8 but preferably 2 to 4 hydroxyl groups, of the kind known per se for the production of both homogenous and cellular polyurethanes. Any mixtures of these compounds may, of course, be used.

Suitable polyesters with hydroxyl groups include e.g. reaction products of polyhydric alcohols, preferably dihydric alcohols with the optional addition of trihydric alcohols, and polybasic, preferably dibasic carboxylic acids. Corresponding polycarboxylic acid and anhydrides or corresponding polycarboxylic acid esters of lower alochols or mixtures thereof may be used for preparing the polyesters instead of free carboxylic acid. The polycarboxylic acids may be aliphatic, cycloaliphatic, aromatic and/or heterocyclic and may be substituted, e.g. by halogen atoms and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and bis-glycol terephthalate. Suitable polyhydric alcohols include e.g. ethylene glycol, propylene-1,2-and -1,3-glycol, butylene-1,4- and 2,3-glycol, hexane-1,6-diol, octane-1,8-diol, neopentyl glycol, cyclohexane dimethanol (1,4-bis-hydroxymethyl cyclohexane), 2-methyl-propane-1,3-diol, glycerol, trimethylolpropane, hexane 1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain some carboxyl end groups. Polyesters of lactones such as ε-caprolactone and hydroxycarboxylic acids such as ω-hydroxycaproic acid may also be used.

The above-mentioned low-molecular weight polyhydric alcohols may also be used according to the invention if they have a molecular weight above 100.

Hydroxyl polyethers suitable for the purpose of the invention, which contain at least two, generally two to eight, preferably two or three hydroxyl groups are known per se and may be obtained e.g. by polymerizing epoxides such as ethylene oxide, propylene oxide, butylene oxide, tetrahydrofuran, styrene oxide or epichlorohydrin each with itself, e.g. in the presence of $BF_3$, or by addition of these epoxides, optionally as mixtures or successively, to starting components which contain reactive hydrogen atoms, such as alcohols or amines, e.g. water, ethylene glycol, propylene-1,3- or 1,2-glycol, trimethylolpropane, 4,4'-dihydroxy diphenylpropane aniline, ammonia, ethanolamine or ethylene diamine. Sucrose polyethers such as those described e.g. in German Auslegeschriften Nos. 1,176,358 and 1,064,938 may also be used according to the invention. In many cases, it is preferred to use polyethers which contain predominantly primary OH-groups (up to 90% by weight based on all the OH-groups present in the polyether). Polyethers which are modified by vinyl polymers may also be used, for example, those obtained by polymerizing styrene or acrylonitrile in the presence of polyethers (U.S. Pat. Nos. 3,383,351; 3,304,273; 3,523,093 or 3,110,695 or German patent specification Nos. 1,152,536) or polybutadienes which contain OH-groups.

Among the polythioethers should be mentioned particularly the condensation products of thiodiglycol with itself and/or with other glycols, dicarboxylic acids formaldehyde, aminocarboxylic acids or amino alcohols. The products are polythio mixed ethers, polythioether esters or polythioether ester amides, depending on the co-component.

Suitable polyacetals include the compounds which may be prepared from glycols such as diethylene glycol triethylene glycol 4,4'-dioxethoxy-diphenyl-dimethylmethane hexane diol and formaldehyde. Polyacetals suitable according to the invention may also be prepared by the polymerization of cyclic acetals.

Polycarbonates having hydroxyl groups may also be used and include those obtained by reacting diols such as propane-1,3-diol, butane-1,4-diol and/or hexane-1,6-diol or diethylene glycol triethylene glycol or tetraethylene glycol with diaryl carbonates such as diphenyl carbonate or phosgene.

Suitable polyester amides and polyamides include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups and modified or unmodified natural polyols such as caster oil, carbohydrates or starch may also be used. Addition products of alkylene oxides to phenol formaldehyde or urea formaldehyde resins are also suitable according to the invention.

Examples of the compounds to be used according to the invention have been described e.g. in High Polymers, Volume XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich 1966, e.g. pages 45 to 71.

According to the invention water and/or readily volatile organic substances are used as blowing agents. Suitable organic blowing agents include acetone, ethyl acetate, halogen-substituted alkanes (such as methylene chloride), chloroform, ethylidene chloride, vinylidene chloride, monofluorotrichloromethane, chlorodifluoromethane or dichlorodifluoromethane, and butane, hexane, heptane or diethyl ether. Compounds which decompose at temperatures above room temperature to liberate gases (e.g., nitrogen), may also act as blowing agents, Examples of said compounds include azo compounds such as azoisobutyric acid nitrile. Other examples of blowing agents and details concerning the use of blowing agents may be found in Kunststoff-Handbuch, Volume VII, published by Vieweg and Höchtlen, Carl-Hanser-Verlag, Munich 1966, e.g. on pages 108 and 108, 453 to 455 and 507 to 510.

Catalysts are often used according to the invention. Catalysts which may be used include tertiary amines such as triethylamine, tributylamine, N-methyl-morpholine, N-ethylmorpholine, N-cocomorpholine, N,N,N',N'-tetramethylethylene diamine, 1,4-diazabicyclo-(2,2,2)-octane, N-methyl-N'-dimethyl aminoethyl-piperazine, N,N-dimethylbenzylamine, bis-(N,N-diethyl-aminoethyl)-adipate, N,N-diethyl benzylamine, pentamethyl diethylene traimine, N,N-dimethylcyclohexylamine, N,N,N',N'-tetramethyl-1,3-butane diamine N,N-dimethyl-$\beta$-phenylethylamine 1,2-dimethyl imidazole and 2-methyl imidazole.

Tertiary amines which contain hydrogen atoms which are reactive with isocyanate groups may also be used and include triethanolamine, triisopropanolamine, N-methyldiethanolamine, N-ethyl diethanolamine, N,N-dimethyl-ethanolamine and their reaction products with alkylene oxides such as propylene oxide and/or ethylene oxide.

Silaamines which contain carbon-silicon bonds may also be used as catalysts and include such compounds as those described in German patent specification No. 1,229,290. Specific examples of said materials are 2,2,4-trimethyl-2-silamorpholine or 1,3-diethylaminoethyl-tetramethyl-disiloxane.

Bases which contain nitrogen such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines and Mannich bases which can be obtained, e.g., from secondary amines, aldehydes and phenols, are also suitable catalysts.

Organic metal compounds may also be used as catalysts and organic tin compounds are particularly desirable.

The organic tin compounds used are preferably tin (II) salts of carboxylic acids, such as tin (II)-acetate, tin (II)-octoate, tin (II)-ethyl hexoate and tin (II)-laurate and the dialkyl tin salts of carboxylic acids e.g. dibutyl tin diacetate, dibutyl tin dilaurate, dibutyl tin maleate or dioctyl tin diacetate.

Mixtures of the above-mentioned catalysts may also be used. Other representatives of catalysts to be used according to the invention and details concerning the action of the catalysts may be found in Kunststoff-Handbuch, Volume VII, published by Vieweg and Höchtlen, Carl-Hanser-Verlag, Munich 1966, e.g. on pages 96 to 102.

The catalysts are generally used in a quantity between about 0.001 and about 10% by weight, based on the quantity of compounds having a molecular weight of 100 to 10,000 which contain at least two hydrogen atoms which are reactive with isocyanates.

Surface-active additives (emulsifiers and foam stabilizers) may also be used according to the invention. Suitable emulsifiers include the sodium salts of ricinoleic sulphonates or of fatty acids or salts of fatty acids with amines, such as oleic acid, diethylamine or stearic acid diethanolamine. Alkali metal or ammonium salts of sulphonic acids such as dodecyl benzene sulphonic acid or dinaphthyl methane disulphonic acid or fatty acids such as ricinoleic acid or of polymeric fatty acids may also be used as surface-active additives. The foam stabilizers usable include water-soluble polyether siloxanes. These compounds generally have a polydimethyl siloxane group attached to a copolymer of ethylene oxide and propylene oxide. Foam stabilizers of this kind have been described in U.S. Pat. No. 2,764,565.

Reaction retarders (i.e., substances which are acidic in reaction such as hydrochloric acid or organic acid halides), cell regulators including paraffins or fatty alcohols or dimethyl polysiloxanes, pigments, dyes and flame-retarding agents such as tris-chloroethyl phosphate or ammonium phosphate and polyphosphate, stabilizers against ageing and weathering, plasticizers, fungistatic and bacteriostatic substances and fillers such as barium sulphate, kieselguhr, carbon black or whiting may also be added according to the invention.

Other examples of surface-active additives, foam stabilizers, cell regulators, reaction retarders, stabilizers, flame-retarding substances, plasticizers, dyes, fillers and fungistatic and bacteriostatic substances and details concerning the use and action of these additives may be found, for example, in Kunststoff-Handbuch, Volume VII, published by Vieweg and Höcthlen, Carl-Hanser-Verlag, Munich 1966, e.g. on pages 103 to 113.

According to the invention, the reactants can be reacted together by the one-step, the prepolymer or the semiprepolymer process, often using mechanical apparatus such as those described in U.S. Pat. No. 2,764,565. Details about equipment which may also be used according to the invention may be found, for example, in Kunststoff-Handbuch, Volumn VII, published by Vieweg and Höchtlen, Carl-Hanser-Verlag, Munich 1966, e.g. on pages 121 to 205.

Addition compounds of lactams and water and/or monohydric and/or polyhydric alcohols which may be used according to the invention as mixtures with the acids of phosphorus and/or the above mentioned esters of phosphorus are known per se and have been described in German Offenlegungsschrift No. 2,129,198.

If in the general formula above, X represents a nitrogen atom and R a pyridine group, optionally substituted by $C_1$–$C_6$ alkyl groups, then for example, compounds of the following formula are suitable:

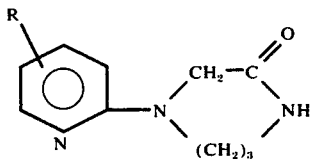

R = $C_1$–$C_6$-alkyl.

The following are examples of suitable lactams: butyrolactam, valerolactam, ε-caprolactam, 1-N-methyl hexahydro-1,4-diazepinone-(3), 1-N-ethyl-hexahydro-1,4-diazepinone-(3), 1-N-propyl-hexahydro-1,4-diazepinone-(3). ε-caprolactam is preferred.

The monhydric alcohols used are preferably those with a molecular weight of 32–500, particularly 32–300, e.g. methanol, ethanol, n- and i-butanol, hexanol, octanol, decanol, dodecanol and octadecanol.

Suitable polyalcohols are, in particular, polyols with a molecular weight of 62–500, preferably 62–300, which have two to eight hydroxyl groups, preferably two to four. Examples include ethylene glycol, propylene glycol, butylene glycol, hexane-1,6-diol, diethylene glycol, dipropylene glycol, tripropylene glycol, tetrapropylene glycol, trimethylolpropane, glycerol, pentaerythritol, hydroxyethylated mannose and saccharose and hexane-1,2,6-triol.

Acids of phosphorus which may be used according to the invention as mixtures with the lactam adducts are also known per se. The following are examples: o-phosphoric acid, diphosphoric acid, m-phosphoric acid and all transitional stages which may be obtained e.g. from phosphorus pentoxide and water. These acids of phosphorus may be used according to the invention either in their anhydrous form or in aqueous solution. Phosphoric acid semiesters are also suitable and include the monoethyl, ethyl, diethyl, cyclohexyl, methyl cyclohexyl, pentyl and methyl phenyl esters of o-phosphoric acid.

Phosphorus acid and its acid esters may also be used according to the invention and include dimethyl, diethyl, dibutyl, cyclohexyl, monophenyl and diphenyl phosphites.

The known phosphonic acids and their acid alkyl, cycloalkyl, aralkyl and aryl esters may also be used according to the invention. Further examples of acids of phosphorus which may be used according to the invention may be found in British patent specification No. 1,056,360.

Neutral esters of phosphoric and/or phosphonic and/or phosphorus acid include the neutral alkyl, cycloalkyl, aralkyl and aryl esters of phosphoric acid, of phosphonic acid and of phosphorus acid, e.g. the methyl, ethyl, butyl, cyclohexyl, benzyl, phenyl and methylphenyl esters as well as the corresponding mixed esters.

All these compounds are known and have been described in British patent specification No. 1,056,360.

The mixtures used according to the invention contain from about 1 to about 99 percent by weight of the lactam adduct and from about 99 to about 1 percent by weight of the acid of phosphorus and/or of the above-mentioned neutral phosphorus ester. They can be prepared in situ.

It has been found that mixtures of orthophosphoric acid and lactam adducts, e.g. mixtures of orthophosphoric acid and the adduct of ε-caprolactam and trimethylolpropane, enable aliphatic polyisocyanates to foam up even in the absence of substantial quantities of tin catalysts which would otherwise be necessary. Tough, very light-fast foams which are free from orthophosphoric acid are obtained in this way. At the same time, the heat of reaction can easily and safely be removed.

The products of the process have the following applications: insulating materials for building panels, pipe casing elements, car roofs, large-surface insulations on roofs of dwellings and industrial buildings, oil storage tanks (for hot contents), liquid tanks (for cold contents) and insulations for refrigerators and freezers.

Further details of the invention may be found in the following examples. The parts indicated are parts by weight. The polysiloxane stabilizer used is sold by DOW CHEMICAL CO under the trade name DC - 193.

EXAMPLE 1

60 parts of an addition compound of ε-caprolactam and 1,1,1-trimethylolpropane (molar ratio of 1:1) having an OH-number 680 are mixed with 30 parts of the compound:

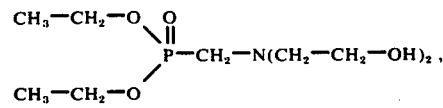

10 parts of an amino polyether of OH-number 660 prepared from ethylene diamine and ethylene oxide/propylene oxide in a weight ratio of 43:57, 20 parts of tris-β-chloroethyl-o-phosphate, 1 part of a polysiloxane stabilizer, 5 parts of N,N-dimethyl-cyclohexylamine as activator and 15 parts of monofluorotrichlormethane as blowing agent. The compounds are then mechanically mixed with 150 parts of a polyphenylpolymethylene polyisocyanate which has been prepared by aniline-formaldehyde condensation followed by phosgenation (31% NCO-content). The mixture is sprayed in the form of a jet onto an asbestos cement plate to test the fire characteristics. The foaming process begins after 3 seconds and the main reaction is completed after 7 seconds. The foam obtained is tough and finely cellular. It has a gross density of 61 kg/m³. The compression strength in the direction of foaming is 0.55 MPa (Megapascal). When the foam is moistened on a metal sheet, only a light, punctiform rust can be seen after 7 days.

EXAMPLE 2

60 parts of an addition compound of ε-caprolactam and 1,1,1-trimethylolpropane (molar ratio of 1:1) having an OH-number of 680 are mixed with 30 parts of the compound:

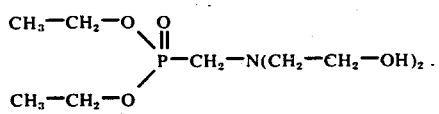

10 parts of an amino polyether of OH-number 660 prepared from ethylene diamine and ethylene oxide/propylene oxide in a weight ratio of 43:57, 20 parts of tris-β-chloroethyl o-phosphate, 1 part of a polysiloxane stabilizer, 5 parts of N,N-dimethyl-cyclohexylamine as activator and 40 parts of monofluorotrichloromethane as blowing agent. The components are then mechanically mixed with 171 parts of a polyphenyl-polymethylene polyisocyanate which has been prepared by aniline-formaldehyde condensation followed by phosgenation (31% NCO-content). The mixture is sprayed in the form of a jet onto an asbestos cement plate to test the fire characteristics. The foaming process begins after 3 seconds and the main reaction is completed after 7 seconds. The resulting foam is tough and finely cellular. It has a gross density of 39 kg/m$^3$. The compression strength in the direction of foaming is 0.23 MPa. When the foam is moistened on a metal sheet, a light, punctiform rust can be seen after 7 days.

A combination of 3 cm of the foam described in Example 2 on the undersurface and 1 cm of the foam of Example 1 on the upper surface (both foams sprayed on an asbestos cement plate), results in endurance against flying sparks and radiant heat which when tested according to DIN 4102 is assessed as "passed" (area burnt off 0.17 m$^2$).

EXAMPLE 3

60 parts of an addition compound of ε-caprolactam and 1,1,1-trimethylolpropane (molar ratio of 1:1) having an OH-number 680 are mixed with 30 parts of the compound:

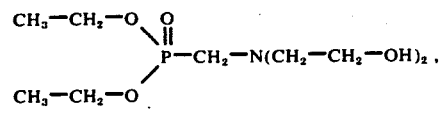

10 parts of an amino polyether having an OH-number of 660 which has been prepared from ethylene diamine and ethylene oxide/propylene oxide in a weight ratio of 43:57, 20 parts of phenyl cresyl ester of o-phosphoric acid, 1 part of a polysiloxane stabilizer, 5 parts of N,N-dimethyl cyclohexylamine as activator and 15 parts of monofluorotrichloromethane as blowing agent. The components are then mechanically mixed with 150 parts of a polyphenyl-polymethylene polyisocyanate which has been prepared by aniline-formaldehyde condensation followed by phosgenation (31% NCO-content). The mixture is sprayed in the form of a jet onto an asbestos cement plate for the purpose of testing the fire characteristics. The foaming process begins after 3 seconds and the main reaction is completed after 7 seconds. The resulting foam is tough and finely cellular. It has a gross density of 84 kg/m$^3$. The compression strength in the direction of foaming is 0.96 MPa. When the foam is moistened on a metal sheet, no rust can be detected after 7 days.

EXAMPLE 4

60 parts of an addition compound of ε-caprolactam and 1,1,1-trimethylolpropane (molar ratio of 1:1) having an OH-number of 680 are mixed with 30 parts of the compound:

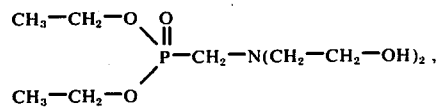

10 parts of an amino polyether with OH-number 660 prepared from ethylene diamine and ethylene oxide/propylene oxide in a weight ratio of 43:57, 20 parts of phenyl cresyl o-phosphate, 1 part of a polysiloxane stabilizer, 5 parts of N,N-dimethyl-cyclohexylamine as activator and 40 parts of monofluorotrichloromethane as blowing agent. The compounds are then mechanically mixed with 171 parts of a polyphenylpolymethylene polyisocyanate prepared by aniline-fomaldehyde condensation followed by phosgenation (31% NCO-content). The mixture is sprayed in the form of a jet onto an asbestos cement plate for the purpose of testing the fire characteristics. The foaming process begins after 3 seconds and the main reaction is completed after 7 seconds. The resulting foam is tough and finely cellular. It has a gross density of 49 kg/m$^3$. The compression strength in the direction of foaming is 0.41 MPa. When the foam is moistened on a metal sheet, no detectable rust is formed after 7 days.

A combination of 3 cm of the foam described in Example 4 on the underside and 1 cm of foam of Example 3 on the upper side (both foams sprayed on an asbestos cement plate), results in a resistance against flying sparks and radiant heat which when tested according to DIN 4102 is assessed as "passed" (area burnt down 0.15 m$^2$).

COMPARISON EXAMPLE 1

40 parts of a polyether having an OH-number of 380 prepared from sucrose 1,2-propylene glycol and water in a weight ratio of 45/53/2 and ethylene oxide/propylene oxide in a weight ratio of 1:9, 20 parts of a polyether having an OH-number of 550 prepared from sucrose and 1,1,1-trimethylolpropane in a weight ratio of 60:40 and ethylene oxide/propylene oxide in a weight ratio of 12:88, 30 parts of the compound:

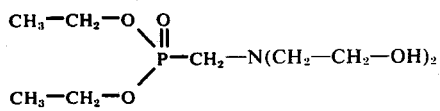

10 parts of an aminopolyether having an OH-number of 660 prepared from ethylene diamine and ethylene oxide/propylene oxide in a weight ratio of 43:57, 20 parts of tris-β-chloroethyl o-phosphate, 1 part of a polysiloxane stabilizer 5 parts of N,N-dimethyl-cyclohexylamine and 15 parts of monofluorotrichloromethane are mixed together. The components are then mixed mechanically with 150 parts of polyphenyl-polymethylene polyisocyanate which has been prepared by aniline-formaldehyde condensation followed by phosgenation (31% NCO-content). The mixture is sprayed in the form of a jet onto an asbestos cement plate for the purpose of testing the fire characteristics. The foaming process begins after 4 seconds and the main reaction is completed after 10 seconds. The resulting foam is tough and finely cellular. It has a gross density of 93 kg/m$^3$. The compression strength in the direction of foaming is 0.93 MPa. When the foam is moistened on a metal sheet, moderate corrosion can be seen after 7 days.

COMPARISON EXAMPLE 2

40 parts of a polyether having an OH-number of 380 prepared from sucrose 1,2-propylene glycol and water in proportions by weight ratio of 45:53:2, ethylene oxide/propylene oxide in a weight ratio of 1:9, 20 parts of a polyether having an OH-number of 530 prepared from sucrose and 1,1,1-trimethylolpropane in a weight ratio of 60:40 and ethylene oxide/propylene oxide in a weight ratio of 12:88, 30 parts of the compound:

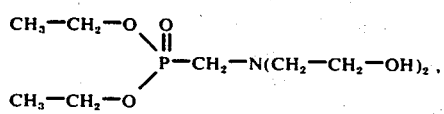

10 parts of an aminopolyether having an OH-number of 660 prepared from ethylene diamine and ethylene oxide/propylene oxide in a weight ratio of 43:57, 20 parts of tris-β-chloroethyl o-phosphate, 1 part of a polysiloxane stabilizer, 5 parts of N,N-dimethyl-cyclohexylamine and 40 parts of monofluorotrichlormethane are mixed together. The components are then mechanically mixed with 171 parts of a polyphenyl-polymethylene polyisocyanate prepared by aniline/formaldehyde condensation followed by phosgenation (31% NCO-content). The mixture is sprayed in the form of a jet onto an asbestos cement plate to test the fire characteristics. The foaming process begins after 5 seconds and the main reaction is completed after 20 seconds. The resulting foam is tough and finely cellular. It has a gross density of 41 kg/m³. The compression strength in the direction of foaming is 0.34 MPa. When the foam is moistened on a metal sheet, moderate corrosion can be seen after 7 days.

A combination of 3 cm of the foam described in Comparison Example 2 on the underside and 1 cm of the foam of Comparison Example 1 on the upper side (both foams sprayed onto an asbestos cement plate), results in an intermittent endurance to flying sparks and radiant heat which when tested according to DIN 4102 is assessed as "passed " (area burnt down 0.18 m²).

The comparison examples demonstrate the distinct superiority of the combinations claimed according to the invention obtained using lactams, particularly in their reactivity and inhibition of corrosion.

EXAMPLE 5

65 parts of a polyester having an OH-number of 370 prepared from diethylene glycol 1,1,1-trimethylolpropane, adipic acid and phthalic acid anhydride, 10 parts of a polyester having an OH-number of 280 prepared from diethylene glycol and phthalic acid anhydride, 19 parts of 1,1,1-trimethylolpropane having an OH-number of 1260 and 16 parts of ε-caprolactam are mixed together at 60° C until a clear solution has been formed. 13.3 parts of o-phosphoric acid are then dissolved in this mixture, also at 60° C. After cooling to room temperature, 1 part of 3-benxyl-4-hydroxybiphenyl-polyglycol ether as emulsifier, 1 part of a polysiloxane stabilizer, 1.5 parts of N,N-dimethyl-cyclohexylamine as activator and 30 parts of monofluorotrichloromethane as blowing agent are added. The components are then mixed for 30 seconds with 138 parts of a polphenyl-polymethylene polyisocyanate which has been prepared by aniline-formaldehyde condensation followed by phosgenation (31% NCO-content). The foaming process begins after 53 seconds and the main reaction is completed after 96 seconds. The foam obtained is tough and finely cellular. It has a gross density of 30 kg/m³. The compression strength in the direction of foaming is 0.17 MPa and the foam is resistant to bending up to a temperature of 91° C. The foam is dimensionally stable at −30° C for 3 hours and at 100° C for 5 hours. The foam has a phosphorous content of 1.39% (based on the total quantity of foamable mixture). In the small scale burning test according to DIN 53,438 the rating for the response to flaming the surface is F 1 and to flaming the edges K 1.

EXAMPLE 6

65 parts of a polyether having an OH-number of 370 prepared from diethylene glycol 1,1,1-trimethylolpropane adipic acid and phthalic acid anhydride, 19 parts of 1,1,1-trimethylolpropane having an OH-number of 1260 and 16 parts of ε-caprolactam are mixed together at 60° C until a clear solution has formed. 13.3 parts of o-phosphoric acid are then dissolved in this mixture, also at 60° C. After cooling to room temperature, 1 part of 3-benzyl-4-hydroxy-biphenylpolyglycolether is added as emulsifier, followed by the addition of 1 part of a polysiloxane stabilizer, 1 part of N,N-dimethylcyclohexylamine as activator, 5 parts of water containing about 0.1% of a sulphonate-based wetting agent and 30 parts of monofluorotrichloromethane as blowing agent. The components are then mixed for 30 seconds with 190 parts of a polyphenyl-polymethylene polyisocyanate which has been prepared by aniline-formaldehyde condensation followed by phosgenation (31% NCO-content). The foaming process begins after 53 seconds and the main reaction is completed after 85 seconds. The resulting foam is tough and finely cellular. It has a gross density of 24 kg/m³. The compression strength in the direction of foaming is 0.14 MPa and the foam is resistant to bending up to a temperature of 143° C. The foam is dimensionally stable at −30° C for 3 hours and at 100° C for 5 hours. It has a phosphorous content of 1.28% (based on the total quantity of foamable mixture). In the small scale burner test according to DIN 53,438, the sample is rated as F 1 when flamed on the surface and K 1 when flamed at the edges.

EXAMPLE 7

65 parts of a polyester having an OH-number of 370 prepared from diethylene glycol, 1,1,1-trimethylolpropane, adipic acid and phthalic acid anhydride, 10 parts of a polyester having an OH-number of 280 prepared from diethylene glycol and phthalic acid anhydride, 19 parts of 1,1,1-trimethylolpropane having an OH-number of 1260 and 16 parts of ε-caprolactam are mixed together at 60° C until a clear solution has formed. When the solution has cooled to room temperature, 1 part of 3-benzyl-4-hydroxy-biphenyl-polyglycol ether as emulsifier, 1 part of a polysiloxane stabilizer, 1.5 parts of N,N-dimethylcyclohexylamine as activator and 2 parts of a dispersion consisting of 1 part of water and 1 part of the sodium salt of a sulphonated castor oil as dispersing agent and 15.7 parts of an 85% aqueous o-phosphoric acid (which therefore contains 2.4 parts of water) are added. The components are then mixed for 20 seconds with 161 parts of a polyphenylpolymethylene polyisocyanate which has been prepared by aniline-formaldehyde condensation followed by phosgenation (31% NCO-content). The foaming process begins after 25 seconds and the main reaction is completed after 51 seconds. The resulting foam is tough and finely cellular. It has a gross density of 32 kg/m$^3$. The compression strength in the direction of foaming is 0.26 MPa and the foam is resistant to bending up to a temperature of 120° C. The foam is dimensionally stable at −30° C for 3 hours and at 100° C for 5 hours. The foam has a phosphorous content of 1.39% (based on the total quantity of foamable mixture). In the small scale burner test according to DIN 53,438, the foam is rated at F 1 for surface flaming and at K 1 for edge flaming.

EXAMPLE 8

65 parts of a polyester having an OH-number of 370 which has been prepared from diethylene glycol, 1,1,1-trimethylolpropane, adipic acid and phthalic acid anhydride, 10 parts of a polyester having an OH-number of 280 which has been prepared from diethylene glycol and phthalic acid anhydride, 19 parts of 1,1,1-trimethylolpropane with OH-number 1260 and 16 parts of ε-caprolactam are mixed together at 60° C until a clear solution is obtained. When the solution has cooled to room temperature there are added 1 part of 3-benzyl-4-hydroxy-biphenyl-polyglycol ether as emulsifier, 1 part of a polysiloxane stabilizer, 1.5 parts of N,N-dimethylcyclohexylamine as activator, 15.7 parts of an 85% aqueous orthophoshoric acid (containing 2.4 parts of water) and 10 parts of monofluorotrichloromethane as blowing agent. The resulting mixture is then mixed for 30 seconds with 145 parts of a polyphenyl-polymethylene polyisocyanate which has been prepared by aniline-formaldehyde condensation followed by phosgenation (31% NCO-content). The foaming process begins after 32 seconds and the main reaction is completed after 47 seconds. The resulting foam is tough and finely cellular. It has a gross density of 31 kg/m$^3$. The compression strength in the direction of foaming is 0.19 MPa and the foam is resistant to bending up to a temperature of 105° C. The foam is dimensionally stable at −30° C for 3 hours and at 100° C for 5 hours. The foam has a phosphorous content of 1.44% (based on the total quantity of foamable mixture). In the small scale burner test according to DIN 53,438, it is rated at F 1 for surface flaming and K 1 for edge flaming.

The edge flaming of polyurethane hard foams is generally a critical factor. According to the present state of the art, the rating K 1 is obtained only with a phosphorous content upwards of about 3% introduced with flame-retarding agents which contain either molecularly fixed or loosely incorporated phosphorous and which must generally additionally contain halogen.

EXAMPLE 9

40 parts of a polyester having an OH-number of 370 which has been prepared from diethylene glycol, 1,1,1-trimethylolpropane, adipic acid and phthalic acid anhydride 10 parts of an amino polyether having an OH-number of 660 which has been prepared from ethylene diamine and ethylene oxide/propylene oxide in a weight ratio of 43:57, 19 parts of 1,1,1-trimethylolpropane having an OH-number of 1260 and 16 parts of ε-caprolactam are mixed together at 60° C until a clear solution is obtained. 15.7 parts of an 85% aqueous o-phosphoric acid are then dissolved in this mixture. When the solution has cooled to room temperature, there are added 1 part of 3-benzyl-4-hydroxy-biphenyl-polyglycolether as emulsifier, 2 parts of a polysiloxane stabilizer, 2 parts of N,N-dimethylcyclohexylamine as activator and 30 parts of monofluorotrichloromethane as blowing agent. The resulting mixture is then mixed for 30 seconds with 130 parts of a polyphenyl-polymethylene polyisocyanate which has been prepared by aniline-formaldehyde condensation followed by phosgenation (31% NCO-content). The foaming process begins after 25 seconds and the main reaction is completed after 70 seconds. The resulting foam is tough and finely cellular. It has a gross density of 23 kg/m$^3$. The compression strength in the direction of foaming is 0.14 MPa and the foam is resistant to bending up to a temperature of 114° C. The foam is dimensionally stable at −30° C for 3 hours and at 100° C for 5 hours. It has a phosphorous content of 1.58% (based on the total quantity of foamable mixture). In the small scale burner test according to DIN 53,438, the foam is rated at F 1 for surface flaming and K 1 for edge flaming.

EXAMPLE 10

65 parts of a polyester having an OH-number of 350 prepared from diethylene glycol, 1,1,1-trimethylolpropane and adipic acid, 2 parts of 3-benzyl-4-hydroxy-biphenylpolyglycol ether and 2 parts of a polysiloxane stabilizer are mixed together. This mixture is then stirred up with an adduct which has been prepared from 19 parts of 1,1,1-trimethylolpropane, 16 parts of ε-caprolactam and 15.5 parts of 75% aqueous phosphorous acid (which therefore contains 3.9 parts of water). The mixture is then mixed with 10 parts of monofluorotrichloromethane as blowing agent and thereafter for 20 seconds with 200 parts of a polyisocyanate prepolymer which has been prepared from polyphenyl-polymethylene polyisocyanate (prepared by aniline-formaldehyde condensation followed by phosgenation 31% NCO-content) and a polyether having an OH-number of 250 (prepared from 1,1,1-trimethylolpropane and ethylene oxide) in a weight ratio of 9:1 (26% NCO-content). The foaming process begins after 25 seconds and the main reaction is completed after 52 seconds. The resulting foam is tough and finely cellular. It has a gross density of 21 kg/m$^3$. The compression strength in the direction of foaming is 0.16 MPa and the foam is resistant to bending up to a temperature of 78° C. The foam is dimensionally stable at −30° C for 3 hours, and shows a contraction of 5 vol% at 100° for 5 hours. The foam has a phosphorous content of 1.34% (based on the total quantity of foamable mixture). In the small scale burner test according to DIN 53,438, the foam is rated at F 1 for surface flaming and K 1 for edge flaming.

EXAMPLE 11

36 parts by weight of a low-viscosity reaction product of 1 mol of ε-caprolactam and 1 mol of trimethylolpropane are mixed with 1 mol of o-phosphoric acid and 1 mol of water. The mixture is then reacted with 75 parts by weight of hexamethylene diisocyanate which contains 0.2 parts by weight of a high-molecular weight polyethylene oxide to increase its viscosity. Uniform foam formation sets in after 4 minutes and an elastic, hard, lightfast foam is obtained.

EXAMPLE 12

The procedure is the same as described in Example 11 but using 165 parts by weight of a low-viscosity biuret polyisocyanate which has been prepared from hexamethylene diisocyanate and tertiary butanol by the process described in German Offenlegungsschrift 23 08 015 and which has an NCO-content of 23% and a viscosity of 3000 cP at 20° C. Uniform foam formation begins after 5 minutes and a surprisingly highly elastic, hard, tough and lightfast foam is obtained. Unit weight: 80 kg/m³.

What is claimed is:

1. In a process for the production of flame resistant, hard polyurethane foam from polyisocyanates, active-hydrogen containing compounds, water and/or blowing agents, and flame retarding agents, the improvement wherein the flame retarding agent used is a mixture of:
   a. an addition compound of
      1. a monoalcohol, a polyalcohol or mixtures thereof, and
      2. a lactam; and
   b. a phosphorous containing acid or acid ester, wherein component (a) is present in said mixture in an amount of from about 1 to about 99 percent by weight, and component (b) is present in said mixture in an amount of from about 99 to about 1 percent by weight, and wherein said addition compound is formed from 0.1 to 15 mols of component (1) and 1 mol of component (2).

2. The process according to claim 1, wherein said component (b) is selected from the group consisting of phosphorus containing acids, neutral phosphoric acid esters, neutral phosphonic acid esters, neutral phorphorous acid esters, and mixtures thereof.

3. The process according to claim 2, wherein said lactam is of the general formula:

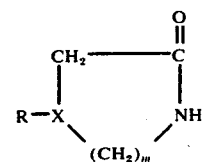

wherein $m$ is an integer of from 0 to 9 and R represents a hydrogen atom when X is a CH-group, and wherein $m$ is 3 and R represents a $C_1$–$C_{18}$ alkyl, a $C_7$–$C_{15}$ aralkyl, a pyridine, or a $C_1$–$C_6$ alkyl group substituted pyridine when X is a nitrogen atom.

4. The process according to claim 3, wherein component (1) is partly or completely replaced by water.

5. The process according to claim 1, wherein said addition compound is formed from 0.1 to 15 mols of component (1) and 1 mol of component (2).

6. The process according to claim 1, wherein said lactam is of the general formula:

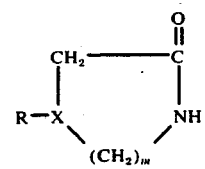

wherein $m$ is an integer of from 0 to 9 and R represents a hydrogen atom when X is a CH-group, and wherein $m$ is 3 and R represents a $C_1$–$C_{18}$ alkyl, a $C_7$–$C_{15}$ aralkyl, a pyridine, or a $C_1$–$C_6$ alkyl group substituted pyridine when X is a nitrogen atom.

7. The product of the process of claim 1.

8. The product of the process of claim 3.

* * * * *